(12) United States Patent
Barscevicius et al.

(10) Patent No.: US 12,375,850 B2
(45) Date of Patent: Jul. 29, 2025

(54) CONCURRENT STREAMING OF CONTENT TO MULTIPLE DEVICES

(71) Applicant: Apple Inc., Cupertino, CA (US)

(72) Inventors: Cesar de Camargo Barscevicius, San Jose, CA (US); Brian D. Pietsch, Foster City, CA (US); Aurie Bendahan, San Jose, CA (US); Victor Gabriel Maraccini, São Paulo (BR); Keith G. Henrickson, San Jose, CA (US); Deepak Iyer, Santa Clara, CA (US); Sanket S. Dave, Sunnyvale, CA (US); Astrid Yi, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 264 days.

(21) Appl. No.: 17/875,348

(22) Filed: Jul. 27, 2022

(65) Prior Publication Data
US 2023/0035128 A1  Feb. 2, 2023

Related U.S. Application Data

(60) Provisional application No. 63/227,300, filed on Jul. 29, 2021.

(51) Int. Cl.
| | |
|---|---|
| *H04R 3/12* | (2006.01) |
| *G06F 3/16* | (2006.01) |
| *G10L 15/22* | (2006.01) |
| *H04R 1/40* | (2006.01) |

(52) U.S. Cl.
CPC ............ *H04R 3/12* (2013.01); *G06F 3/165* (2013.01); *G10L 15/22* (2013.01); *H04R 1/403* (2013.01)

(58) Field of Classification Search
CPC ...... G06F 3/162; G06F 3/167; G06F 3/04847; G06F 1/1688
USPC ............................................................ 700/94
See application file for complete search history.

(56) References Cited

U.S. PATENT DOCUMENTS

| | | | |
|---|---|---|---|
| 8,416,070 | B1 | 4/2013 | Rowe |
| 9,936,018 | B2 | 4/2018 | Kulkarni et al. |
| 10,074,371 | B1* | 9/2018 | Wang ..................... G10L 15/08 |
| 10,440,075 | B2 | 10/2019 | Garmark et al. |
| 10,580,405 | B1* | 3/2020 | Wang ..................... G10L 15/30 |
| 10,607,257 | B2* | 3/2020 | Shaw ................ G06Q 30/0276 |
| 2006/0190974 | A1 | 8/2006 | Lee |

(Continued)

*Primary Examiner* — Alexander Krzystan
(74) *Attorney, Agent, or Firm* — BAKERHOSTETLER

(57) ABSTRACT

The subject technology provides for concurrent streaming of media content to multiple media devices. A host device may receive, from a first accessory device, a first request for first media content, the first request corresponding to a first voice input, and receive, from a second accessory device, a second request for second media content, the second request corresponding to a second voice input to the second accessory device. The host device may store a first context record including identification information for the first accessory device and the first media content, and store, while storing the first context record, a second context record including identification information for the second accessory device and the second media content. The host device may stream the first media content to the first accessory device, and stream, to second accessory device and concurrently with the streaming of the first media content, the second media content.

20 Claims, 6 Drawing Sheets

(56) References Cited

U.S. PATENT DOCUMENTS

2020/0175986 A1\* 6/2020 Jones ..................... G06F 3/167
2022/0365760 A1\* 11/2022 Ekron ................. G06F 16/9538

\* cited by examiner

CONCURRENT STREAMING OF CONTENT TO MULTIPLE DEVICES

CROSS REFERENCE TO RELATED APPLICATIONS

This application claims the benefit of priority to U.S. Provisional Patent Application No. 63/227,300, filed on Jul. 29, 2021, the disclosure of which is hereby incorporated herein in its entirety.

TECHNICAL FIELD

The present description relates generally to management of media output devices and, more particularly, for example, to management of concurrent streaming of content to multiple media output devices.

BACKGROUND

Media devices such as speakers, headphones, earbuds, televisions, etc. can receive audio and/or video data from a media provider device or a host device (such as a smartphone, a smart speaker, etc.) over a wired or wireless connection. In some cases, a media device can include a microphone to receive audio input that can be transmitted to the media provider device or the host device.

BRIEF DESCRIPTION OF THE DRAWINGS

Certain features of the subject technology are set forth in the appended claims. However, for purpose of explanation, several aspects of the subject technology are set forth in the following figures.

DETAILED DESCRIPTION

Figure 1:
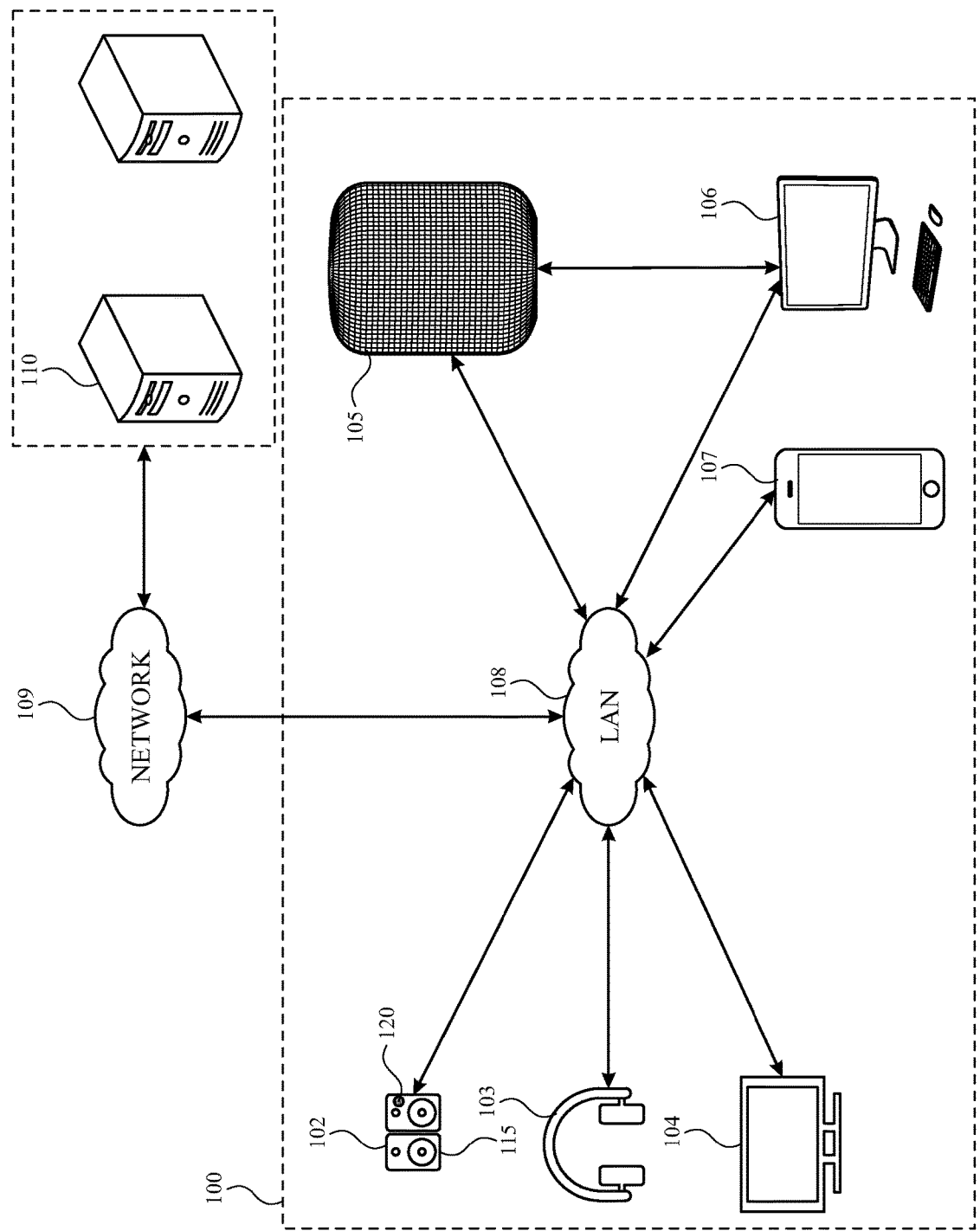
FIG. 1 illustrates an example system architecture including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject technology provides for concurrent streaming of (audio or video or other digital) content to multiple accessory devices that are on a same network, e.g., Wi-Fi network in a home environment. In some implementations, the concurrent streaming is provided and managed by a host device that is also on the same network as the accessory devices. The host device is equipped with a virtual assistant configured to accept a user's audio/voice requests based on a specific trigger word or phrase. The accessory devices may or may not be equipped with such a virtual assistant, but are configured to utilize the virtual assistant at the host device. In some implementations, the accessory devices may include an implementation of a front-end or a thin client of the virtual assistant and a user may utilize the virtual assistant front-end to access the virtual assistant back-end implemented at the host device. For example, an accessory device may be configured to accept a user's audio/voice input (including the trigger word or phrase and a media content request), detect that the input does include the trigger word or phrase for the virtual assistant at the host device, and if so, send the user's audio/voice input to the host device to activate the virtual assistant at the host device such that the host device can process the media content request. In another implementation, after detecting that the input does include the trigger word or phrase for the virtual assistant at the host device, the accessory device may convert the user's audio/voice input to text using a speech-to-text technique, and send the text to the host device for activating the virtual assistant at the host device and accordingly having the media content request processed. The request may be processed locally at the host device. Based on the processing of the request, the host device obtains the requested media content (e.g., by invoking an appropriate music or video streaming service configured at the host device), which is streamed to the requesting accessory device and/or concurrently, to another accessory device that is indicated in the request as an intended recipient and is connected to the host device.

In some implementations of the subject technology, in addition to receiving and processing a request for media content from a first accessory device (as discussed above), the host device also receives and processes a second request for media content from a second accessory device. Like the first accessory device, the second accessory device may not be equipped with any virtual assistant (e.g., the virtual assistant equipped at the host device), but is configured to accept a second audio/voice input (including the trigger word or phrase and a second media content request), detect that the second input does include the trigger word or phrase, and if so, send the second input to the host device to activate the virtual assistant at the host device such that the host device can process the second media content request. Based on the processing of the second request, the host device obtains the second media content according to the second request, and the second media content is streamed to the second accessory device and/or concurrently, to another accessory device that is indicated in the second request as an intended recipient and is connected to the host device. The host device can concurrently process media content requests from the first and second accessory devices, and as such, can concurrently stream the first media content to the first accessory device and the second media content to the second accessory device.

In some implementations of the subject technology, for each accessory device or group of accessory devices that are receiving a particular media stream, the host device maintains a "context record" that includes information identifying the accessory device(s) receiving the media content and the content of the media stream. Each context record may also include information identifying the accessory device that requested that particular media stream. Each accessory device receiving the media content can be registered in only one context record at a given time instant. Accordingly, if based on a further user input at an accessory device that is actively receiving and outputting a current media stream, the accessory device requests for and starts receiving from the host device a new media stream, a context record for the new media stream may be created at the host device and the context record corresponding to the current media stream may be deleted at the host device. In some scenarios, the host device can itself be a media output device in a context record based on the media request from the accessory device.

In some implementations, the host device can provide context information for each context record to one or more other devices on the network to allow the other devices to facilitate control of the media streams. For example, the host device may send a context record related to a particular media stream being provided to a particular set of accessory devices to a computing device that is separate from but connected to the host device. The computing device may process the context record and accordingly provide a user interface (e.g., on a display of the computing device) using which a user can control the playback (e.g., change the volume, pause, etc.) of the particular media stream on one or more of the particular set of accessory devices. For controlling the media stream, the computing device may generate a control signal based on the user input on the user interface (e.g., to pause the media stream based on the user's input on the pause icon on the user interface). The computing device may send the control signal corresponding to the context record to the host device, and the host device may process the control signal and modify (e.g., pause) the media stream provided to one or more of the particular set of accessory devices according to the control signal. In some implementations, the host device may also delegate another device on the network as a temporary host device to fulfill a request based on, e.g., number of requests the host device is currently handling, the type of content requested, etc.

In some implementations, to effect the interaction between the accessory devices (which may lack a virtual assistant application) and the host device (which may be configured with a virtual assistant), the accessory devices can each include a software program, e.g., a voice recognition model, within their memories. This software program can be provided by an entity (e.g., the manufacturer) associated with the host device so that regardless of the manufacturer of the accessory devices, they can communicate with a particular host device. The voice recognition model loaded at the accessory devices is specific to the virtual assistant configured at the host device. For example, the voice recognition model may be trained to listen for and detect in the voice input received at the accessory device the specific trigger phrase that is used to activate the virtual assistant. However, the voice recognition model loaded at the accessory devices may not be able to identify or distinguish between different spoken words (other than the trigger phrase). Once the trigger phrase is detected, cooperative operations (e.g., requesting for and streaming of certain media content) between the accessory device and the host device can be performed to provide the corresponding virtual assistant functionality at the accessory device.

FIG. 1 illustrates an example network environment 100 that includes various devices in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes accessory devices 102, 103, and 104 (hereinafter "the electronic devices 102-104"), a host device 105, a temporary host device 106, a computing device 107, a local area network ("LAN") 108, a network 109, and one or more content providers such as a content provider 110. The number and types of devices and their arrangement depicted in the network environment 100 is not meant to be restrictive; the network environment 100 may include any number and other types of host devices, accessory devices, computing devices, temporary host devices, and content providers, any of which may be connected directly or indirectly using any of different network technologies with other devices and components of the network environment 100 in a manner that is different from the depiction of FIG. 1.

By way of example, in FIG. 1, the accessory device 102 is depicted as a pair of speakers, the accessory device 103 is depicted as headphones (e.g., a pair of speakers mounted in speaker housings that are coupled together by a headband), and the accessory device 104 is depicted as a television (or another display device with speakers fitted therein). In some implementations, the accessory device 102 may be a speaker having no "smart" functionalities (e.g., in contrast to the host device 105, described below) or having a limited feature set than the host device 105. For example, the accessory device 102 may be a speaker fitted or otherwise operationally integrated into a showerhead. However, these depictions of the accessory devices 102-104 are not meant to be limiting, and in general, one or more of the accessory devices 102-104 may be implemented as a media device capable of receiving audio/voice input via, e.g., a microphone in the media device, and capable of outputting audio, video and/or other types of media. One or more of the accessory devices 102-104 may include one or more audio transducers such as a speaker 115 configured to output audio (e.g., from streaming music). One or more of the accessory devices 102-104 may include one or more audio transducers such as a microphone 120 (depicted as a dot on the surface of the speaker 115) configured to receive audio input such as voice inputs. The accessory devices 102-104 may be, and/or may include all or part of, the device discussed below with respect to FIG. 2, and/or the electronic system discussed below with respect to FIG. 6.

Although not visible in FIG. 1 (see, e.g., FIG. 2 and/or FIG. 6), one or more of the accessory devices 102-104 may include processing circuitry (e.g., including memory and/or one or more processors) and communications circuitry (e.g., one or more antennas, radio frequency circuits, etc.) for receiving and/or processing media content from one or more of the host device 105, the temporary host device 106, the computing device 107, and/or the content provider 110. The processing circuitry of the accessory device or another device may operate the speaker 115 to generate sound according to the audio content and operate a display, e.g., of the television or accessory device 104, to output an image or a video according to the image/video content. In some implementations, the accessory device 104 may include as an embedded component or may be operationally connected to an electronic device (not shown), which is configured as a set-top box or a digital media player. The set-top box or digital media player may be configured to receive digital data such as music and/or video as streaming content and provide it to the accessory device 104 (e.g., a television or other video display).

The memory may store one or more machine learning models (e.g., a voice recognition models) for detecting one or more corresponding words or phrases, such as one or more corresponding trigger phrases that are each specific to a virtual assistant application of a particular provider (e.g., the manufacturer or the operating system provider of the host device 105). In various implementations, the accessory devices 102-104 are provided by a common provider (e.g., a common manufacturer or a common operating system provider) or are provided by one or more different providers. In various implementations, each of the host device 105, the temporary host device 106, and the computing device 107 include at least one virtual assistant application that is activated by a corresponding trigger phrase. In various implementations, the host device 105, the temporary host device 106, and the computing device 107 are provided by a common provider (e.g., a common manufacturer or a common operating system provider) or are provided by one or more different providers, and have the same virtual assistant application or different virtual assistant applications. In some implementations, the host device 105, the temporary host device 106, and the computing device 107 are provided by a common provider, which is different from the provider(s) of the accessory devices 102-104.

One or more of the accessory devices 102-104 may include communications circuitry for communications (e.g., directly or via network 108 and/or 109) with the host device 105, the temporary host device 106, the computing device 107, and/or the content provider 110. The communications circuitry may include, for example, one or more wireless interfaces, such as WLAN radios, cellular radios, Bluetooth radios, Zigbee radios, near field communication (NFC) radios, and/or other wireless radios. The host device 105, the temporary host device 106, the computing device 107, and/or the content provider 110 may include communications circuitry for communications (e.g., directly or via network 108 and/or 109) with the accessory devices 102-104 and/or with the others of the host device 105, the temporary host device 106, the computing device 107, and/or the content provider 110, the communications circuitry including, for example, one or more wireless interfaces, such as WLAN radios, cellular radios, Bluetooth radios, Zigbee radios, near field communication (NFC) radios, and/or other wireless radios.

At a given time, one or more of the accessory devices 102-104 may be paired with one or more of the host device 105, the temporary host device 106, and the computing device 107. During operation, one or more of the accessory devices 102-104 may connect to and/or disconnect from any of the one or more paired devices.

One or more of the accessory devices 102-104 may also include one or more sensors such as touch sensors and/or force sensors for receiving user input. For example, a user of one or more of the accessory devices 102-104 may tap a touch sensor or pinch the force sensor briefly to control the media (e.g., audio) content being played, to control volume of the playback, and/or to toggle between modes of operation. In one or more implementations, the user may hold down the force sensor to send a trigger signal to a connected/paired host device 105, such as a trigger signal to activate the virtual assistant operation at the host device 105.

By way of example, in FIG. 1, the host device 105 is depicted as a smart speaker, the temporary host device 106 is depicted as a desktop computer, and the computing device 107 is depicted as a smartphone with a touchscreen. However, any of the host speaker 105, the temporary host device 106, and the computing device 107 may be, for example, a smartphone, a media hub, a portable computing device such as a laptop computer, a tablet device, a wearable device such as a smart watch, a smart band, and the like, any other appropriate device that includes, for example, a memory storing a virtual assistant application, processing circuitry and/or communications circuitry for providing media content (e.g., obtained from content provider 110) to one or more of the accessory devices 102-104.

In some implementations, the host device 105, the temporary host device 106, and the computing device 107 can provide an application, such as a virtual assistant application, that responds to spoken inputs received using an audio transducer (e.g., a microphone) of that device. The virtual assistant application may include and/or utilize one or more voice recognition models for interpreting the spoken inputs, such as to differentiate and/or detect various words and/or phrases that the models are trained to recognize. The virtual assistant application may be activated, by a specific and/or pre-configured trigger phrase, to begin listening for further spoken inputs. In one or more implementations, a virtual assistant application may be a native application for that device, and as such, the trigger phrase would be specific to a manufacturer of the device, to a provider of an operating system of the device. In one or more implementations, a virtual assistant application may be provided to the device by a third party that is different from the manufacturer of the device and the provider of the operating system of the device, and as such, the trigger phrase would be specific to the third party that provides the virtual assistant application on the device. In one or more implementations, an electronic device may provide multiple virtual assistant applications (e.g., multiple virtual assistants) from multiple providers, each having a specific trigger phrase.

Content provider 110 may provide access to content such as streaming content (e.g., video content, audio content) or other subscription-based content (e.g., electronic book content or the like) to user devices (e.g., to one or more of the host speaker 105, the temporary host device 106, the computing device 107 and the accessory devices 102-104) that are associated with a user account that has been established with the content provider 110. One or more of the servers for content provider 110 may be, and/or may include all or part of the device discussed below with respect to FIG. 2, and/or the electronic system discussed below with respect to FIG. 6.

In one or more implementations, the network 108 may include one or more different network devices/network medium and/or may utilize one or more different wireless and/or wired network technologies, such as Ethernet, optical, Wi-Fi, Bluetooth, Zigbee, Powerline over Ethernet, coaxial, Ethernet, Z-Wave, cellular, or generally any wireless and/or wired network technology that may communicatively couple two or more devices. In one or more implementations, the network 108 may be an interconnected network of devices that may include, and/or may be communicatively coupled to, the Internet.

Figure 2:
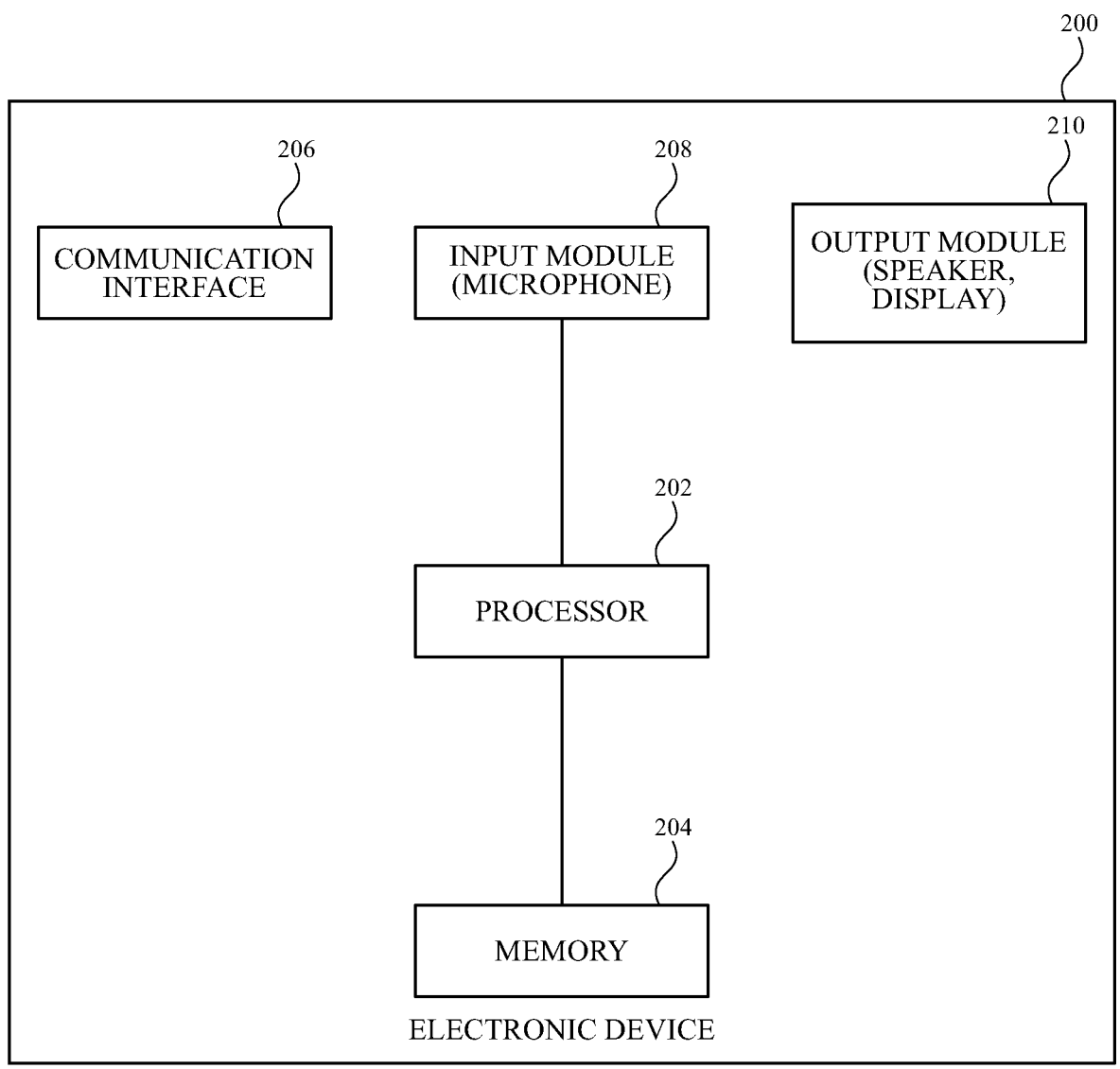
FIG. 2 illustrates an example electronic device that may be implemented in the subject system in accordance with one or more implementations.

FIG. 2 illustrates an example device that may implement a system for any of the devices depicted in FIG. 1 in accordance with one or more implementations. Not all of the depicted components may be used in all implementations, and one or more implementations may include additional or different components than those shown in the figure. Variations in the arrangement and type of the components may be made without departing from the spirit or scope of the claims as set forth herein. Additional components, different components, or fewer components may be provided.

The device 200 may include a processor 202, a memory 204, a communication interface 206 and an input device or module 208, and an output device or module 210. The processor 202 may include suitable logic, circuitry, and/or code that enable processing data and/or controlling operations of the device 200. In this regard, the processor 202 may be enabled to provide control signals to various other components of the device 200. The processor 202 may also control transfers of data between various portions of the device 200. Additionally, the processor 202 may enable implementation of an operating system or otherwise execute code to manage operations of the device 200.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, in a case where the device 200 corresponds to one or more of the accessory devices 102-104, the memory 204 may store a voice recognition model corresponding to the virtual assistant application installed, e.g., at the host device 105. In one or more implementations, in a case where the device 200 corresponds to one or more of the host device 105, the temporary host device 106 and the computing device 106, the memory 204 may store a virtual assistant application corresponding to the voice recognition model installed, e.g., at the accessory devices 102-104. The memory 204 of the one or more of the host device 105, the temporary host device 106 and the computing device 106, the memory 204 may store user account and authentication information (e.g., a username and password) to gain access to and establish a connection with the content provider 110.

The input device 208 may include suitable logic, circuitry, and/or code for capturing input, such as audio input (e.g., voice requests), remote control input, touchscreen input, keyboard input, etc. The output device 210 may include suitable logic, circuitry, and/or code for providing output, such as audio output (e.g., music), video output (e.g., a digital image or video), etc.

The communication interface 206 may include suitable logic, circuitry, and/or code that enables wired or wireless communication, such as between any of the electronic devices 102-107 and/or the server(s) 110 over the network 108 (e.g., in conjunction with the network 108). The communication interface 206 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 202, the memory 204, the communication interface 206, the input device 208, the output module 210 and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
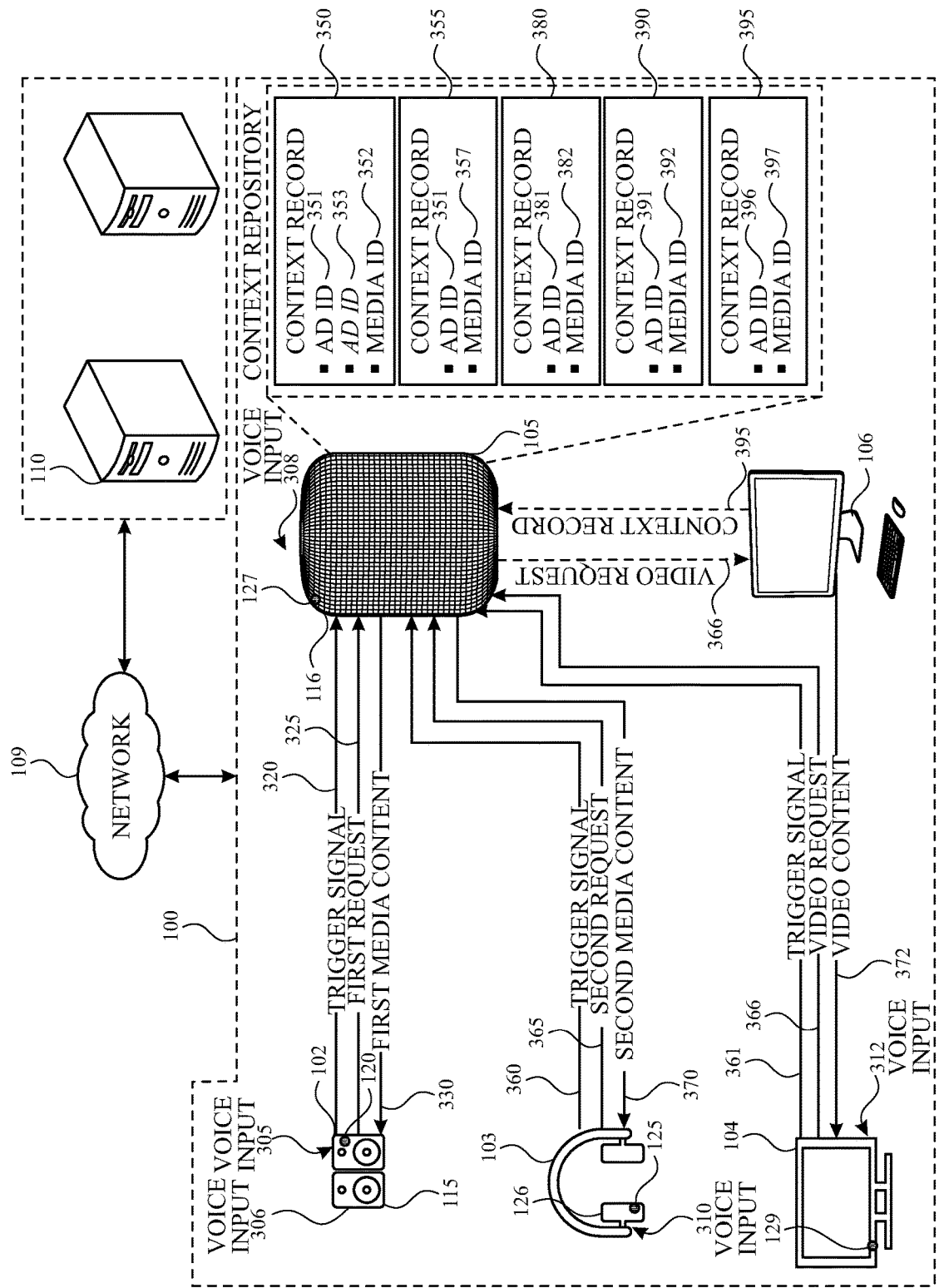
FIG. 3 illustrates a schematic diagram of accessory devices in communication and operational with a host device in accordance with implementations of the subject technology.

FIG. 3 illustrates an environment in which the accessory devices 102-104 are paired with and connected to the host device 105. FIG. 3 also illustrates information and/or operations that can be utilized and/or performed by the host device 105 and the accessory devices 102-104 to provide, for example, concurrent media content streams to the accessory devices 102-104. In the example of FIG. 3, the accessory devices 102-104 may be operated to output media content (e.g., streaming audio content, streaming video content, audio content for a phone call or a video conference, or the like) received from the host device 105, using speakers and displays of the accessory devices, and/or to receive audio input using microphone(s) 120, 125. In the example of FIG. 3, the host device 105 may be in an active state or an inactive state, and one or more of the accessory devices 102-104 may be in an operational mode, in which the accessory device is in a listening operation to detect a trigger phrase that is specific to a virtual assistant application at the host device 105.

In the example of FIG. 3, a voice input 305 from a user of the accessory device 102 is received by a microphone 120 of the device 102, and a voice input 310 from a user of the accessory device 103 is received by a microphone 125 of the device 103. As discussed in further detail hereinafter, one or more of the accessory devices 102-104 may have preloaded a voice recognition model that is trained to detect the trigger phrase (specific to the virtual assistant at the host device 105) in audio/voice input, into a processor (e.g., into on-chip memory of a processor integrated circuit (IC)) of the respective accessory device. When the voice input 305 and/or voice input 310 includes the trigger phrase (e.g., when the user speaks the trigger phrase), an output of the voice recognition model may cause the respective accessory device(s) 102, 103 send a respective trigger signal to the host device 105 to activate the virtual assistant operation at the host device 105. In some implementations, the accessory device 102 and/or the accessory device 103 are spatially distant from the host device 105 such that the voice input 305 and/or the voice input 310 are directly received only by the respective accessory device (i.e., the voice input(s) are not directly received by the host device 105).

In various implementations, one or more of the accessory devices 102-104 store in its memory (e.g., memory 204) one or more voice recognition models including a voice recognition model specific to the virtual assistant application provided at the host device 105. However, in some implementations, instead of being stored locally at the accessory device, the voice recognition model(s) may be stored at a remote server which is communicatively connected to with the accessory device. The voice recognition model at the accessory devices 102-104 may be trained to detect a particular trigger phrase corresponding to the virtual assistant program at the host device 105. In one or more implementations, the voice recognition model may include a standard version and a premium version of the voice recognition model, each trained to recognize the same trigger phrase. For example, the premium version of the voice recognition model may include a larger parameter set than the standard version of the voice recognition model for the same trigger phrase, and may thus be able to detect the trigger phrase is a wider variety of noise conditions, by a wider variety of input voices, or in audio inputs with lower signal-to-noise than the standard version (as examples). In this example, the premium version of the voice recognition model may be selected and loaded by the accessory devices 102-104 with relatively more memory and/or processing resources, and the standard version of the voice recognition model may be selected and loaded by the accessory devices 102-104 devices (e.g., from a same or different vendor) with relatively less memory and/or processing resources.

In an example operational scenario, one or more of the accessory devices 102-104 may establish a connection with the host device 105 (or vice-versa), e.g., by exchanging connection information. The connection information may include security information (e.g., keys for secure communication) that are generated and/or exchanged during a pairing process for the host device 105 and one or more of the accessory devices 102-104. Once paired, additional connection information may be exchanged to connect the host device 105 and one or more of the accessory devices 102-104. The additional connection information may include packets of data (e.g., Bluetooth packets when the connection being established is a Bluetooth connection) transmitted from one or more of the accessory devices 102-104 to the host device 105 (and vice-versa), the packets including device identification information of the respective device. For example, the device information may include a vendor identifier (ID) or a media access control (MAC) address or a serial number or a combination thereof (or another identifier) that may identify the respective accessory device. Following such information exchange, a connection may be established between the host device 105 and one or more of the accessory devices 102-104.

Further, in this example, as noted above, the accessory device 102 receives the voice input 305 (e.g., "Hey Host, play Pop hits") via its microphone 120. The processor 202 of the accessory device 102 may process the voice input (e.g., using natural language processing or other speech processing techniques) for detecting in the voice input the trigger phrase (e.g., "Hey Host") associated with the voice recognition model (corresponding to the virtual assistant application at the host device 105) at the device 102. If the trigger phrase is detected, the accessory device 102 may send a trigger signal 320 to the host device 105, as indicated in FIG. 3. Responsive to detecting the trigger phrase in the voice input 305, the accessory device 102 may also provide feedback (e.g., audio or tactile feedback) to the user to indicate that the trigger phrase has been detected and/or that the virtual assistant application is being activated at the host device 105. In one or more implementations, the trigger signal 320 that is triggered by the detection of the trigger phrase in the voice input 305 using the voice recognition model may be the same as, or functionally similar to, a trigger signal that is generated by a user input (e.g., a tap, a double tap, a squeeze, a press, or other user input) to a sensor of the accessory device 102. The host device 105 may receive the trigger signal 320 from the accessory device 102, prior to receiving a first request for first media content, the first request including an audio recording of the voice input 305, from the accessory device 102. Upon receiving and responsive to the trigger signal 320, the host device 105 may create a "session" or an "instance" for the accessory device 102, the session which receives the media content request from the accessory device 102 and activates the virtual assistant application for processing of the request and for subsequent interaction with and/or operation of the virtual assistant application. The host device 105 may create such a session for every accessory device from which it receives a trigger signal (similar to the trigger signal 320).

Following the trigger signal 320, the accessory device 102 may send a first request 325 including, for example, the audio recording of "Hey Host, play Pop hits" or only the portion of the voice input 305 that follows the trigger phrase "play Pop hits," to the host device 105. The host device 105 or the virtual assistant application, upon receiving the first request 325 from the device 102-specific session, processes the first request 325 based on, e.g., natural language processing or other speech processing techniques. For example, the virtual assistant application may include and/or utilize a voice recognition model (e.g., the same or similar voice recognition model at the device 102) for interpreting the audio recording, such as to differentiate and/or detect various words and/or phrases that the model is trained to recognize, and determine details about first media content requested in the first request 325. For example, based on the processing of the audio recording in the first request 325, the virtual assistant application may determine or identify one or more details of the requested first media content including, but not limited to, (a) the type of the first media content (e.g., music, podcast, video, etc.); (b) a specific genre of the first media content (e.g., pop, rock, comedy, instrumental music, etc.); (c) a title or entity associated with the first media content (e.g., title of a song or a movie, an artist or an actor or a music company label associated with the first media content, etc.); (d) an appropriate source for the first media content (e.g., a music or video streaming service provided by the content provider 110, or audio/video files stored locally at the host device 105 or at other devices in the network environment 100 accessible to the host device 105, etc.); and (e) intended recipient(s) of the first media content (e.g., by default the requesting accessory device is considered as the intended recipient but the first request 325 may identify additional recipients of the first media content such as accessory device 104). In some implementations, the first request 325 includes an identifier of the first media content, the identifier generated by the accessory device 102 based on the voice input 305.

In this example, the host device 105 or the virtual assistant application may determine that the first media content requested in the first request 325 ("play Pop hits") relates to popular songs in the pop music genre to be obtained as streaming music content from the content provider 110. To access the content or services provided by the content provider 110, the host device 105 may have an established connection or may establish a connection via network 109 with the content provider 110 and log into the content provider using user account details of the user who provided the voice input 305 at the device 102. As such, the host device 105 may send a request to and receive from the content provider 110 the identified music stream. The content provider 110 may then transmit the requested music stream (including, e.g., the music including "Pop hits" songs) to the host device 105 or the device 102-specific session at the host device 105, which transmits or streams a first media content 330 to the accessory device 102. In one or more implementations, the processor 202 of the accessory device 102 may operate the speaker 115 of the accessory device 102 to effect outputting of the first media content 330 received from the host device 105.

In some scenarios, related to the first request 325, the host device 105 may create and store, e.g., in a context repository in the memory 204 of the host device 105, a context record 350 specific to the first request 325. The context record 350 may include accessory device identification information "AD ID" 351 for the recipient of the first media content 330, e.g., the accessory device 102 in this example, and media identification information "Media ID" 352 for the media content provided to the recipient, e.g., the first media content 330. The identification information AD ID 351 may include the device identification information that the accessory device shared with the host device 105 while establishing a connection with the host device 105, e.g., a media access control (MAC) address or a serial number or a combination thereof (or another identifier) of the accessory device. The identification information Media ID 352 may include media content-identifying information determined by the host device 105 based on the processing of the audio recording in the first request 325 (as discussed above). In some implementations, the first request 325 includes the Media ID 352, which is generated by the accessory device 102 based on the voice input 305. The context repository may include multiple context records corresponding to media content requests from multiple accessory devices. However, at a given time instant, each accessory device receiving media content can be registered in only one context record.

Continuing with the example illustrated in FIG. 3, similar to the processing of the voice input 305 and subsequent operations and interactions between the accessory device 102 and the host device 105, the voice input 310 received at the accessory device 103 is processed such that the following operations and interactions between the accessory device 103 and the host device 105 results in a second media content 370 streamed from the host device 105 to the accessory device 103. The processing, operations and interactions related to the voice input 305 and related to the voice input 310 may or may not occur concurrently or in parallel at the host device 105. However, the second media content 370 may be streamed to the accessory device 103 concurrently with the streaming of the first media content 330 to the accessory device 102.

In this example, the accessory device 103 receives the voice input 310 (e.g., "Hey Host, play Mozart Piano") via its microphone 125. The processor 202 of the accessory device 103 may process the voice input 310 (e.g., using natural language processing or other speech processing techniques) for detecting in the voice input 310 the trigger phrase (e.g., "Hey Host") associated with the voice recognition model (corresponding to the virtual assistant application at the host device 105) at the device 103. If the trigger phrase is detected, the accessory device 103 may send a trigger signal 360 to the host device 105, as indicated in FIG. 3. Responsive to detecting the trigger phrase in the voice input 310, the accessory device 103 may also provide feedback (e.g., audio or tactile feedback) to the user to indicate that the trigger phrase has been detected and/or that the virtual assistant application is being activated at the host device 105. In one or more implementations, the trigger signal 360 that is triggered by the detection of the trigger phrase in the voice input 310 using the voice recognition model may be the same as, or functionally similar to, a trigger signal that is generated by a user input (e.g., a tap, a double tap, a squeeze, a press, or other user input) to a sensor of the accessory device 103. The host device 105 may receive the trigger signal 360 from the accessory device 103, prior to receiving a second request for second media content, the second request including an audio recording of the voice input 310, from the accessory device 103. Upon receiving and responsive to the trigger signal 360, the host device 105 may create a "session" or an "instance" specific for the accessory device 103, the session which receives the media content request from the accessory device 103 and activates the virtual assistant application for processing of the request and for subsequent interaction with and/or operation of the virtual assistant application.

Upon receiving the trigger signal 360, the accessory device 103 may send a second request 365 including, for example, the audio recording of "Hey Host, play Mozart Piano" or only the portion of the voice input 310 that follows the trigger phrase "play Mozart Piano," to the host device 105. The host device 105 or the virtual assistant application, upon receiving the second request 365 from the device 103-specific session, processes the second request 365 based on, e.g., natural language processing or other speech processing techniques. For example, the virtual assistant application may include and/or utilize a voice recognition model (e.g., the same or similar voice recognition model at the device 103) for interpreting the audio recording, such as to differentiate and/or detect various words and/or phrases that the model is trained to recognize, and determine details about second media content requested in the second request 365. For example, based on the processing of the audio recording in the second request 365, the virtual assistant application may determine or identify one or more details of the requested second media content including, but not limited to, (a) the type of the second media content (e.g., music, podcast, video, etc.); (b) a specific genre of the second media content (e.g., pop, rock, comedy, instrumental music, etc.); (c) a title or entity associated with the second media content (e.g., title of a song or a movie, an artist or an actor or a music company label associated with the first media content, etc.); (d) an appropriate source for the second media content (e.g., a music or video streaming service provided by the content provider 110, or audio/video files stored locally at the host device 105 or at other devices in the network environment 100 accessible to the host device 105, etc.); and (e) intended recipient(s) of the second media content (e.g., by default the requesting accessory device is considered as the intended recipient but the second request 365 may identify additional recipients of the second media content such as accessory device 104). In some implementations, the second request 365 includes an identifier of the second media content, the identifier generated by the accessory device 103 based on the voice input 310.

In this example, the host device 105 or the virtual assistant application may determine that the second media content requested in the second request 365 ("play Mozart Piano") relates to piano music by Mozart (in the instrumental music genre) to be obtained as streaming music content from the content provider 110. To access the content or services provided by the content provider 110, the host device 105 may have an established connection or may establish a connection via network 109 with the content provider 110 and log into the content provider using user account details of the user who provided the voice input 310 at the device 103. As such, the host device 105 may send a request to and receive from the content provider 110 the identified music stream. The content provider 110 may then transmit the requested music stream (Mozart's piano composition music stream) to the host device 105 or the device 103-specific session at the host device 105, which transmits or streams a second media content 370 to the accessory device 103. In one or more implementations, the processor 202 of the accessory device 103 may operate a speaker 126 of the accessory device 103 to effect outputting of the second media content 370 received from the host device 105. As noted above, the second media content 370 may be streamed to the accessory device 103 concurrently with the streaming of the first media content 330 to the accessory device 102.

In some implementations, related to the second request 365, the host device 105 may create and store, e.g., in the context repository in the memory 204 of the host device 105, a context record 380 specific to the second request 365. The context record 380 may include accessory device identification information AD ID 381 for the recipient(s) of the second media content 370, e.g., the accessory device 103 in this example, and media identification information Media ID 382 for the media content provided to the recipient(s), e.g., the second media content 370. The identification information AD ID 381 (similar to AD ID 351) may include the device identification information that the accessory device shared with the host device 105 while establishing a connection with the host device 105, e.g., a media access control (MAC) address or a serial number or a combination thereof (or another identifier) of the accessory device. The identification information Media ID 382 (similar to Media ID 352) may include media content-identifying information determined by the host device 105 based on the processing of the audio recording in the second request 365. In some implementations, the second request 365 includes the Media ID 382, which is generated by the accessory device 103 based on the voice input 310. As noted above, at a given time instant, each accessory device receiving media content from the host device can be registered in only one context record.

In some scenarios within the context of FIG. 3, while the accessory device 102 is outputting the first media content 330, the accessory device 102 may receive voice input 306 at the microphone 120. The voice input 306 may include the trigger phrase and a request for third media content, different from the first media content 330, indicating the user wishes to change the media content being played out at the accessory device 102. The accessory device 102 may process the voice input 306 in the same manner as the processing of the voice input 305 described above, and send another trigger signal (similar to trigger signal 320) as well as a third request (similar to first request 325) that includes, e.g., an audio recording of the voice input 306 (or a portion thereof that follows the trigger phrase). To process the third request corresponding to the voice input 306, the host device 105 may use the same device 102-specific session it created for the first request 325. Similar to the operations described above with respect to the processing of the first request 325, the host device 105 may process the third request to identify the third media content requested in the third request and an appropriate source for the third media content. The host device 105 may obtain the third media content from the source (e.g., the content provider 110), stop the streaming of the first media content 330, and start streaming the third media content to the accessory device 102. The third media content may be streamed to the accessory device 102 concurrently with the streaming of the second media content 370 to the accessory device 103. In one or more implementations, the processor 202 of the accessory device 102 may operate the speaker 115 of the accessory device 102 to effect outputting of the third media content.

Related to the third request and streaming of the third media content, the host device 105 may create and store, e.g., in the context repository, a new context record 355 specific to the third request. Similar to the context record 350, the context record 355 may include accessory device identification information AD ID 351 for the recipient of the third media content, e.g., the accessory device 102 in this example, and media identification information Media ID 357 (similar to Media ID 352). Relatedly, since the host device 105 stop streaming the media content 330, the host device 105 may delete the context record 350 from the context repository.

In some scenarios within the context of FIG. 3, the voice input 305 and the first request 325 may include information that the first media content 330 is to be provided (e.g., streamed) to an additional device (e.g., accessory device 104 and/or the host device 105) in addition to the accessory device 102. Accordingly, as part of processing and responding to the first request 325 (described above), the host device 105 may also transmit or stream the first media content 330 to the additional device concurrently with the streaming of the first media content 330 to the accessory device 102. In a scenario in which the host device 105 is a smart speaker and indicated as the additional device for the first media content 330 (e.g., in a voice input directly received at the host device 105), the processor 202 of the host device 105 may operate its speaker 116 to effect outputting (e.g., playing out) of the first media content 330 concurrently with the streaming of the first media content 330 to the accessory device 102. Relatedly, the host device 105 may update the context record 350 to add accessory device identification information AD ID 353 of the additional device (e.g., identification information of the accessory device 104 and/or the host device 105, whichever is the recipient(s) of the first media content 330 with Media ID 352).

In some scenarios within the context of FIG. 3, the host device 105 may be a smart speaker and directly receives a voice input 308 (e.g., "Hey Host, play Drake") at a microphone 127 of the host device 105. The processor 202 of the host device 105 may process the voice input 308 (e.g., using natural language processing or other speech processing techniques) for detecting in the voice input 308 the trigger phrase (e.g., "Hey Host"). The processor 202 of the host device 105 may use the voice recognition model of the virtual assistant application at the host device 105 to process the voice input 308. If the trigger phrase is detected, the host device 105 may provide feedback (e.g., audio or tactile feedback) to the user to indicate that the trigger phrase has been detected, and activate the virtual assistant application at the host device 105. Upon activation of the virtual assistant application based on the voice input 308, the host device 105 may create a "session" or an "instance" specific for further processing of the voice input 308. As part of the host device 105-specific session, The virtual assistant application processes the audio portion of the voice input 308 that follows the trigger phrase (i.e., "play Drake" in this example) based on, e.g., natural language processing or other speech processing techniques. For example, the virtual assistant application may include and/or utilize the voice recognition model for interpreting the audio portion of the voice input 308, such as to differentiate and/or detect various words and/or phrases that the model is trained to recognize, and determine details about media content requested in the voice input 308. In this example, the host device 105 or the virtual assistant application may determine that the media content requested in the voice input 308 relates to songs/music by the artist, Drake. Accordingly, the host device 105 may connect with and obtain a Drake-related music stream from an appropriate music streaming source (e.g., at the content provider 110), and start outputting that music through the speaker 116, e.g., concurrently with the streaming of the first media content 330 to the accessory device 102 and the streaming of the second media content 370 to the accessory device 103.

In some implementations, related to the voice input 308, the host device 105 may create and store, e.g., in the context repository, a context record 390. The context record 390 may include accessory device identification information AD ID 391 for the recipient(s) of the media content requested in the voice input 308 (e.g., the host device 105 in this example), and media identification information Media ID 392 for the media content provided to the recipient(s), e.g., the Drake-related music stream in this example (e.g., similar to Media ID 352 or 382).

In some scenarios within the context of FIG. 3, the accessory device 104 may receive voice input 312 at a microphone 129. The voice input 312 may include the trigger phrase and a request for video media content. The accessory device 104 may process the voice input 312 in the same manner as the processing of the voice input 305 at the accessory device 102 described above, and send a trigger signal 361 (e.g., similar to trigger signal 320) as well as a video request 366 (e.g., similar to the first request 325) that includes, e.g., an audio recording of the voice input 312 (or a portion thereof that follows the trigger phrase). In processing the video request 366, the host device 105 may determine that the video request 366 cannot be completed by the host device 105, e.g., because based on a number of requests being currently processed by the host device 105, a type of the media content requested in the video request 366, and/or based on other factors. For example, the host device 105 may not be associated or operational with a source or provider of video content (e.g., a video streaming service provider), and as such, the host device 105 may not be enabled to complete requests for video content. In this scenario, the host device 105 may identify another device within the network environment 100 (e.g., the temporary host device 106) that is capable of processing and completing the video request 366. The host device 105 transmits the video request 366 to the temporary host device 106 for processing. For example, the temporary host device 106 may be communicatively operational with a server providing a video streaming service (via network 109). As such, the temporary host device 106 may send a video content request based on the video request 366 to the video streaming service, and in response, receive video content 372 from the video streaming service. The temporary host device 106 may provide (e.g., stream) the video content 372 to the accessory device 104. In some implementations, the temporary host device 106 may handoff the connection to the video streaming service, or otherwise facilitate the connection between the accessory device 104 and the video streaming service, such that the accessory device may receive the video content 372 directly from the video streaming service. The video content 372 may be streamed to the accessory device 104 concurrently with the streaming of the first media content 330 to the accessory device 102 and the streaming of the second media content 370 to the accessory device 103. In one or more implementations, the processor 202 of the accessory device 104 may operate the display and the speaker(s) of the accessory device 104 to play the video content 372 at the accessory device 104.

Related to the video request 366, the temporary host device 106 may create a new context record 395 and send it to the host device 105 for storing, e.g., in the context repository. For example, similar to the context record 350, the context record 395 may include accessory device identification information AD ID 396 for the recipient of the video content 372, e.g., the accessory device 104 in this example (e.g., similar to AD ID 351), and media identification information Media ID 397 (e.g., similar to Media ID 352) of the video content 372.

Figure 4:
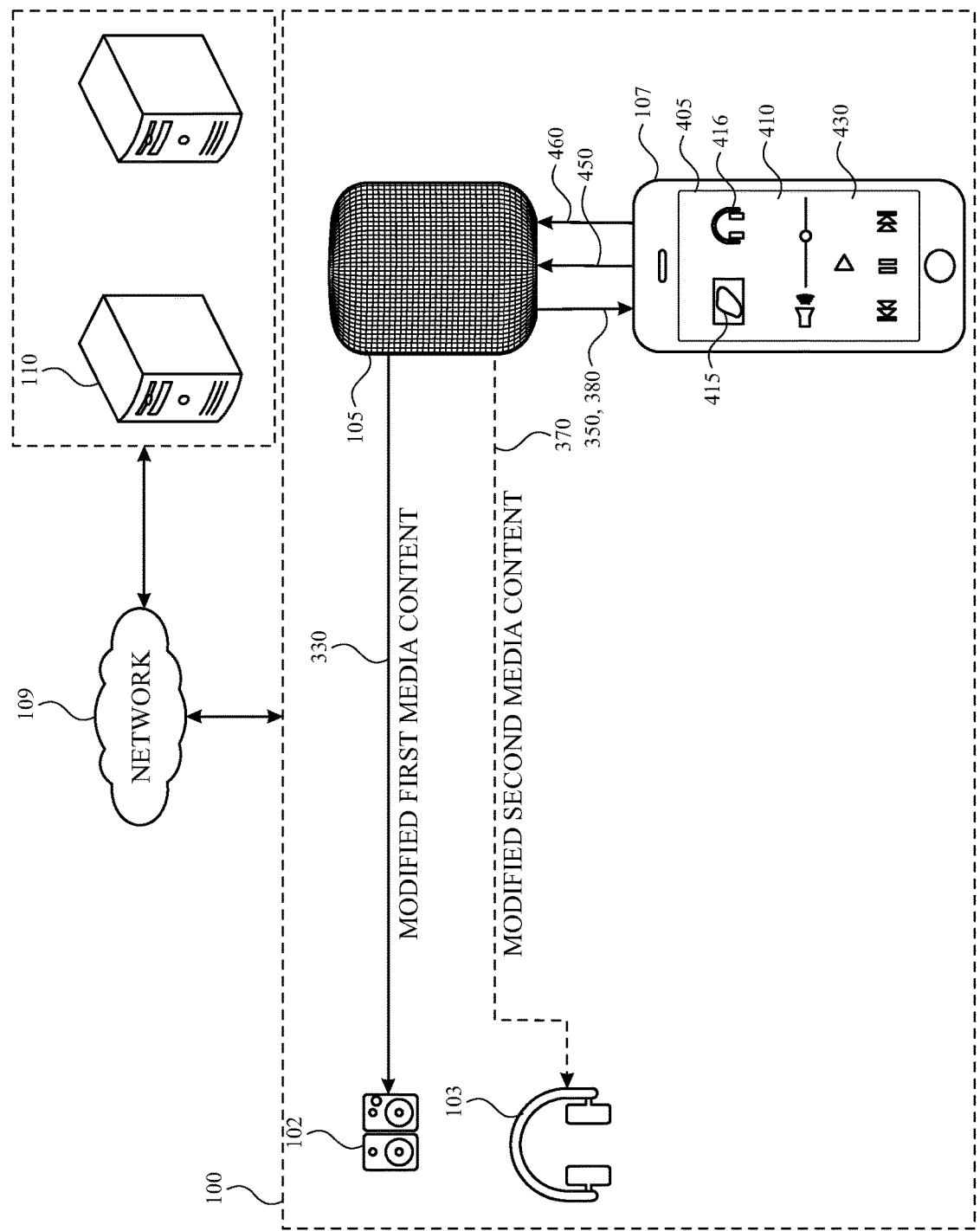
FIG. 4 illustrates another schematic diagram of accessory devices in communication and operational with a host device in accordance with implementations of the subject technology.

Referring now to FIG. 4, in some implementations, the host device 105 may provide a user interface (e.g., on a touch-responsive display screen) that displays status and playback controls for one or more media content streams (e.g., first media content 330, second media content 370, etc.) that are being provided by the host device 105 to corresponding one or more accessory devices and/or outputted at the host device 105. However, in a scenario in which the host device 105 does not have the capability or functionality to provide such a user interface, the host device 105 may provide the context records for active media content streams to another device (e.g., the computing device 107) in the network environment 100, that device having the requisite hardware and functionality to provide the user interface to enable control of the media content streams. For example, the host device 105 may send the context records 350, 380 to the computing device 107. As described above with respect to FIG. 3, the context record 350 corresponds to the first media content 330 provided to the accessory device 102 and the context record 380 corresponds to the second media content 370 provided to the accessory device 103.

The computing device 107 may process the context records 350, 380 to generate and provide on a touch-responsive display 405 a user interface 410. The user interface 410 may include device icons 415, 416 of the accessory devices 102, 103 (based on the AD ID 351, AD ID 381 in the respective context records) and one or more media control icons 430 (e.g., including volume control, play/pause, skip forward, reverse, etc.). For controlling or modifying the streaming of a specific media content stream, a user may select one of the device icons 415, 416 (e.g., indicated by the border around the icon 415) by providing a touch input to the area of the display 405 displaying that device icon. The user may then provide control input (e.g., touch input) to one or more of the control icons 430 indicating the manner in which the user wishes to control or modify the media content streamed to the accessory device corresponding to the selected device icon. Based on the control input, the computing device 107 may generate a control signal 450 that may include information identifying the media content to be controlled/modified (e.g., the first media content 330) and how the media content is to be controlled/modified (e.g., a change in the volume at which the first media content 330 is played at the accessory device 102). The computing device 107 may send the control signal 450 to the host device 105, and the host device 105 may modify the media content (e.g., the first media content 330) and provide the modified media content (e.g., the first media content 330 at a changed playback volume level) to the corresponding accessory device (e.g., the accessory device 102). In some implementations, the computing device 107 may generate and send to the host device 105 a different control signal 460 if the user selects the device icon 416 for the accessory device 103 and provides a control input to modify the media content 370 using control icons 430 (e.g., to pause the streaming of the second media content 370). The computing device 107 may send this different control signal 460 to the host device 105, and the host device 105 may modify the second media content 370, e.g., pause the streaming of the media content 370 to the accessory device 103 (the paused streaming is illustrated as a dashed line from the host device 105 to the accessory device 103 in FIG. 4). The host device 105 and/or the computing device 107 may control or modify the output of media (e.g., first media content 330, second media content 370) to the respective accessory devices independently. For example, the host device 105 and/or the computing device 107 may allow the user to control or modify (e.g., pause) the streaming output of the first media content 330 to the first accessory device 102 independent of the streaming output of the second media content 370 to the second accessory device 103.

Figure 5:
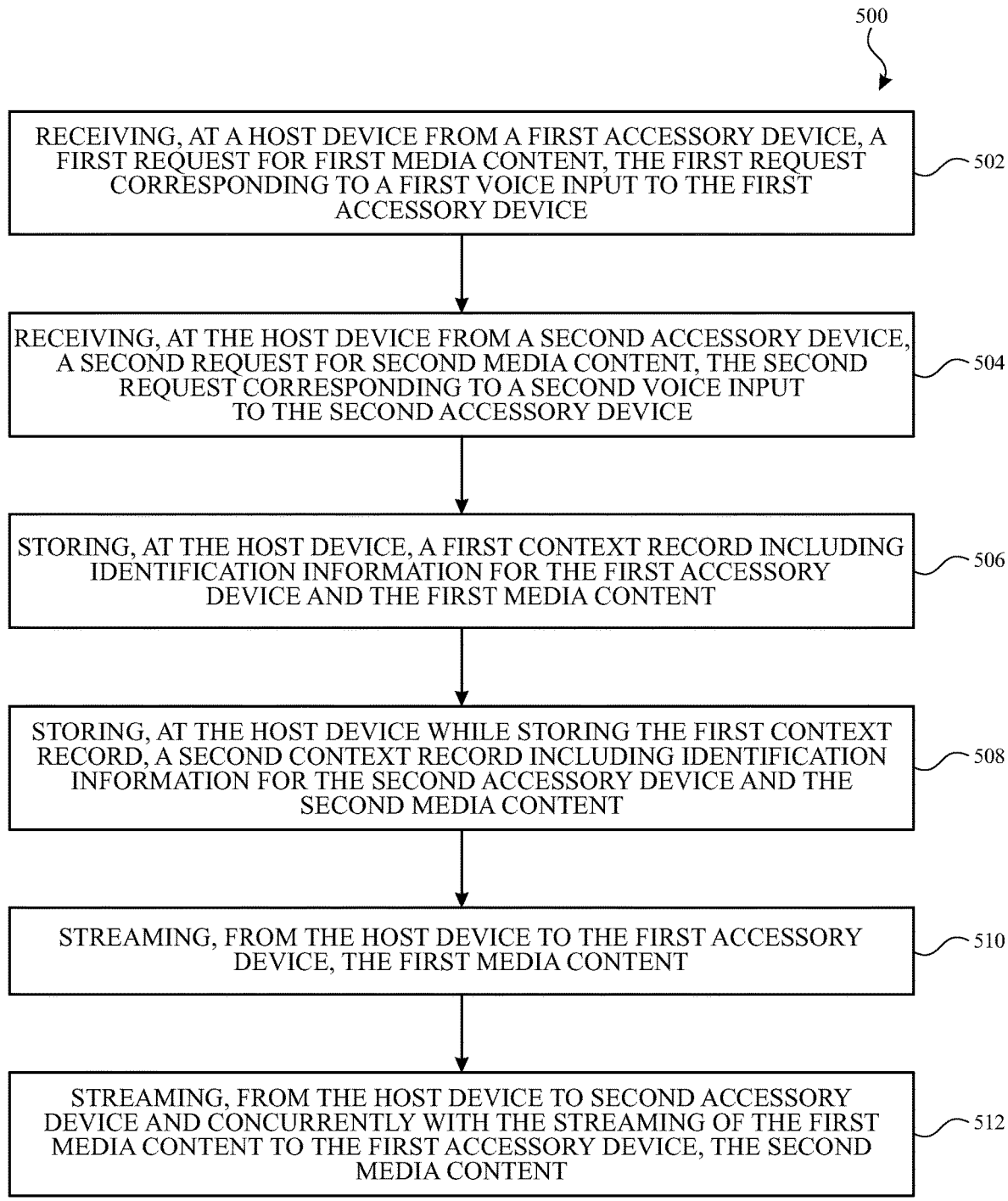
FIG. 5 illustrates a flow diagram for an example process in accordance with implementations of the subject technology.

FIG. 5 illustrates a flow diagram of an example process for concurrent streaming of media content to multiple accessory devices from a host device in accordance with one or more implementations. For illustrative purposes, the process 500 is primarily described herein with reference to the host device 105 of FIG. 3. However, the process 500 is not limited to the host device 105, and one or more blocks (or operations) of the process 500 may be performed by one or more other components or devices in the network environment 100 (illustrated in FIG. 3 for example). Further, for illustrative purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

In the example of FIG. 5, in operation 502, the host device 105 may receive from a first accessory device (e.g., the accessory device 102), a first request 325 for first media content 330. The first request 325 may correspond to a first voice input 305 to the first accessory device 102. In some implementations, the first request 325 includes an audio recording of the voice input 305. In operation 504, the host device 105 may receive from a second accessory device (e.g., the second accessory device 103), a second request 365 for second media content 370. The second request 365 may correspond to a second voice input 310 to the second accessory device 103. In some implementations, the second request 365 includes an audio recording of the voice input 310.

In the example of FIG. 5, in operation 506, the host device 105 stores (e.g., in a context repository at the host device 105) a first context record (e.g., the context record 350) including identification information (e.g., AD ID 351) for the first accessory device 102 and the first media content 330 (e.g., Media ID 352). In operation 508, the host device 105 stores (e.g., in a context repository at the host device 105) a second context record (e.g., the context record 380) including identification information (e.g., AD ID 381) for the second accessory device 103 and the second media content 370 (e.g., Media ID 382).

In the example of FIG. 5, in operation 510, the host device 105 streams the first media content 330 to the first accessory device 102, and in operation 512, the host device 105 streams the second media content 370 to the second accessory device 103.

As described above, one aspect of the present technology is the gathering and use of data available from specific and legitimate sources for training and/or operating machine learning models. The present disclosure contemplates that in some instances, this gathered data may include personal information data that uniquely identifies or can be used to identify a specific person. Such personal information data can include voice samples, voice profiles, demographic data, location-based data, online identifiers, telephone numbers, email addresses, home addresses, biometric data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for recognizing a trigger phrase or determining details of a media content request from a voice input from a user.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates aspects in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed aspects, the present disclosure also contemplates that the various aspects can also be implemented without the need for accessing such personal information data. That is, the various aspects of the present technology are not rendered inoperable due to the lack of all or a portion of such personal information data.

Figure 6:
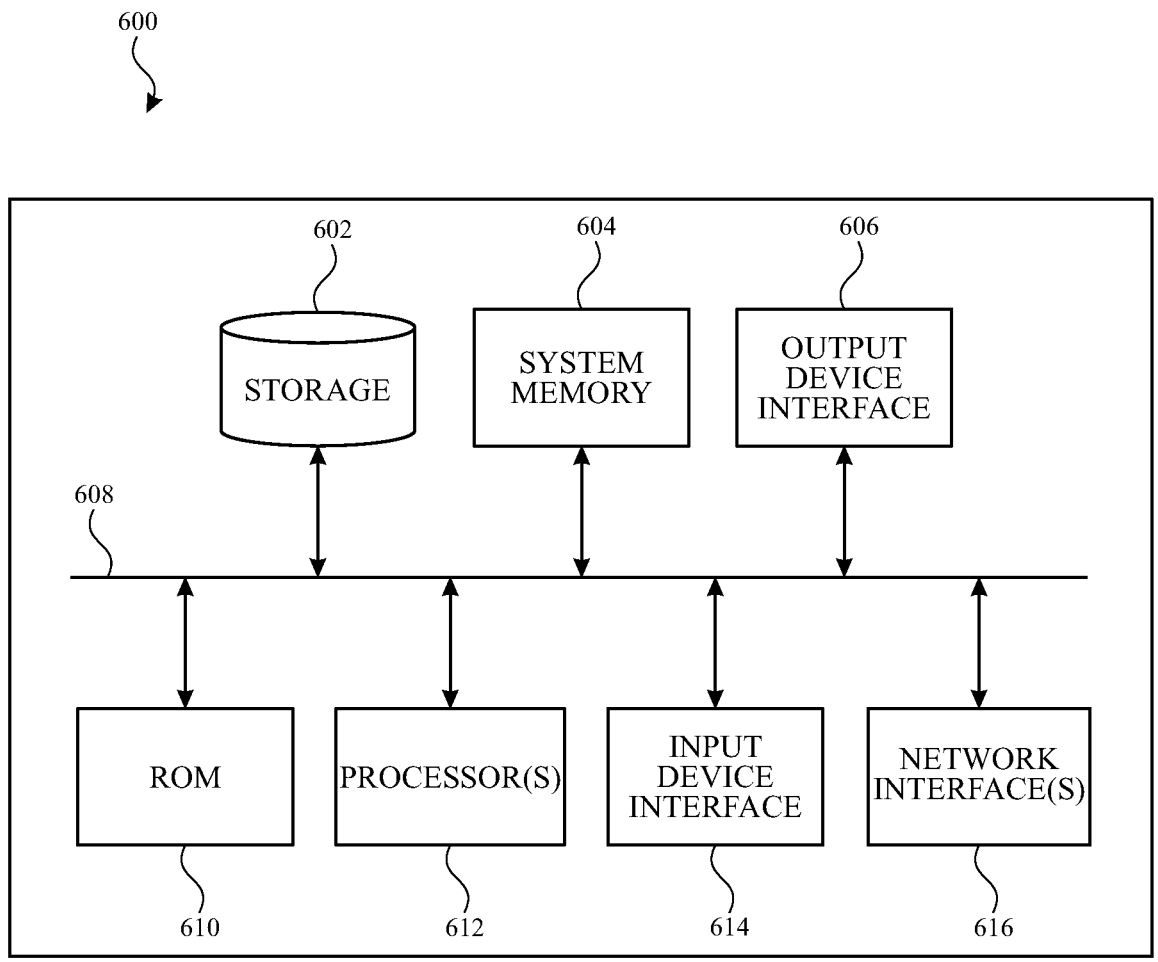
FIG. 6 illustrates an electronic system with which one or more implementations of the subject technology may be implemented.

FIG. 6 illustrates an electronic system 600 with which one or more implementations of the subject technology may be implemented. The electronic system 600 can be, and/or can be a part of the accessory devices 102-104, the host device 105, the temporary host device 106, the computing device 107, the content provider 110, as shown in FIG. 1. The electronic system 600 may include various types of computer readable media and interfaces for various other types of computer readable media. The electronic system 600 includes a bus 608, one or more processing unit(s) 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610 (which are each implemented as a non-transitory computer-readable medium). From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks and/or to one or more network nodes through the one or more network interface(s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

In accordance with aspects of the disclosure, a method is provided that includes receiving, at a host device from a first accessory device, a first request for first media content, the first request corresponding to a first voice input to the first accessory device; receiving, at the host device from a second accessory device, a second request for second media content, the second request corresponding to a second voice input to the second accessory device; storing, at the host device, a first context record including identification information for the first accessory device and the first media content; storing, at the host device while storing the first context record, a second context record including identification information for the second accessory device and the second media content; streaming, from the host device to the first accessory device, the first media content; and streaming, from the host device to second accessory device and concurrently with the streaming of the first media content to the first accessory device, the second media content.

In accordance with aspects of the disclosure, a host device is provided that includes at least one processor; and a memory including instructions for interacting with one or more accessory devices that, when executed by the at least one processor, cause the at least one processor to: receive, from a first accessory device, a first request for first media content, the first request corresponding to a first voice input to the first accessory device; receive, from a second accessory device, a second request for second media content, the second request corresponding to a second voice input to the second accessory device; store, in the memory, a first context record including identification information for the first accessory device and the first media content; storing, in the memory while storing the first context record, a second context record including identification information for the second accessory device and the second media content; stream, to the first accessory device, the first media content; and stream, to second accessory device and concurrently with the streaming of the first media content to the first accessory device, the second media content.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure described herein.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

What is claimed is:

1. A method, comprising:
   receiving, at a host device from a first accessory device, a first request for first media content, the first request comprising an audio recording of a first voice input to the first accessory device;
   processing, at the host device, the first request, the processing to determine a first media identifier corresponding to the first media content based on the audio recording;
   receiving, at the host device from a second accessory device, a second request for second media content, the second request corresponding to a second voice input to the second accessory device and the second request comprising a second media identifier of the second media content, the second media identifier generated by the second accessory device based on the second voice input;
   bypassing, by the host device, the processing of the second request that comprises the second media identifier generated by the second accessory device;
   storing, at the host device, a first context record including identification information for the first accessory device and the first context record including the first media identifier of the first media content that was determined by the host device;
   storing, at the host device while storing the first context record, a second context record including identification information for the second accessory device and the second context record including the second media identifier of the second media content that was determined by the second accessory device;
   streaming, from the host device to the first accessory device, the first media content based on the first media identifier determined by the host device and stored in the first context record; and
   streaming, from the host device to the second accessory device and concurrently with the streaming of the first media content to the first accessory device, the second media content based on the second media identifier that was determined by the second accessory device and stored in the second context record.

2. The method of claim 1, wherein the processing at the host device, the first request, the processing to determine the first media identifier corresponding to the first media content based on the audio recording comprises performing, at the host device, natural language processing on the first request to determine the first media identifier based on the audio recording, further wherein the natural language processing is bypassed for the second request that comprises the second media identifier generated by the second accessory device based on the second voice input.

3. The method of claim 1, wherein the first request comprising the audio recording of the first voice input is received from the first accessory device responsive to detection of a trigger word or phrase in the first voice input by the first accessory device.

4. The method of claim 1, further comprising:
   receiving, at the host device from the first accessory device, a third request for third media content, the third request corresponding to a third voice input to the first accessory device;
   storing, at the host device, a third context record including identification information for the first accessory device and a third media identifier corresponding to the third media content;
   deleting, at the host device, the first context record; and
   streaming, from the host device to the first accessory device, the third media content.

5. The method of claim 1, further comprising:
   streaming, from the host device to a third accessory device and concurrently with the streaming of the first media content to the first accessory device, the first media content based on the first request; and
   updating, at the host device, the first context record to add identification information for the third accessory device.

6. The method of claim 1, wherein the first accessory device is spatially distant from the host device such that the first voice input is directly received only by the first accessory device.

7. The method of claim 1, further comprising:
   receiving, at the host device from a third accessory device, a third request for third media content, the third request corresponding to a third voice input to the third accessory device;
   determining, at the host device, a temporary host device; and
   transmitting, from the host device to the temporary host device, the third request for processing, wherein the temporary host device is configured to stream the third media content to the third accessory device.

8. The method of claim 7, wherein the determining of the temporary host device is based on a number of requests from a plurality of accessory devices being currently processed by the host device, or a type of the third media content, or both.

9. The method of claim 1, further comprising:
providing the first context record and the second context record to a computing device that is separate from the host device.

10. The method of claim 9, further comprising:
receiving a control signal corresponding to the first context record from the computing device; and
modifying the first media content streaming to the first accessory device based on the control signal.

11. The method of claim 10, further comprising:
receiving a different control signal corresponding to the second context record from the computing device; and
modifying the second media content streaming to the second accessory device based on the different control signal.

12. The method of claim 1, wherein the host device comprises a smart speaker.

13. The method of claim 12, further comprising:
receiving a voice input to the host device; and
responsive to the voice input to the host device:
    adding identification information for the host device to the first context record; and
    outputting the first media content from the smart speaker.

14. The method of claim 12, further comprising:
receiving a third voice input to the host device, the third voice input corresponding to a third request for third media content; and
responsive to the third voice input to the host device:
    storing, at the host device, a third context record including identification information for the host device and a third media identifier corresponding to the third media content; and
    outputting, concurrently with the streaming of the first media content to the first accessory device and the streaming of the second media content to the second accessory device, the third media content from the smart speaker.

15. The method of claim 1, wherein the host device, the first accessory device, and the second accessory device are connected to a common local area network.

16. A host device, comprising:
at least one processor; and
a memory including instructions for interacting with one or more accessory devices that, when executed by the at least one processor, cause the at least one processor to:
    receive, from a first accessory device, a first request for first media content, the first request comprising an audio recording of a first voice input to the first accessory device;
    perform natural language processing for the first request to determine a first media identifier corresponding to the first media content based on the audio recording;
    receive, from a second accessory device, a second request for second media content, the second request corresponding to a second voice input to the second accessory device and the second request excluding the second voice input and comprising text content generated by the second accessory device based on the second voice input;
    process the second request to determine a second media identifier corresponding to the second media content without performing natural language processing for the second request;
    store, in the memory, a first context record including identification information for the first accessory device and the first media identifier of the first media content determined by performing the natural language processing for the first request;
    store, in the memory while storing the first context record, a second context record including identification information for the second accessory device and the second media identifier of the second media content that was determined without performing the natural language processing for the second request;
    stream, to the first accessory device, the first media content based on the first media identifier stored in the first context record; and
    stream, to the second accessory device and concurrently with the streaming of the first media content to the first accessory device, the second media content based on the second media identifier stored in the second context record.

17. The host device of claim 16, wherein the first request comprising the audio recording of the first voice input is received from the first accessory device responsive to detection, at the first accessory device, of a trigger word or phrase in the first voice input.

18. The host device of claim 16, wherein the instructions, when executed by the at least one processor, further cause the at least one processor to:
receive, from the first accessory device, a third request for third media content, the third request corresponding to a third voice input to the first accessory device;
store, in the memory, a third context record including identification information for the first accessory device and a third media identifier corresponding to the third media content;
delete, from the memory, the first context record; and
stream, to the first accessory device, the third media content.

19. A non-transitory computer-readable medium comprising instructions, which when executed by at least one computing device, cause the at least one computing device to perform operations comprising:
receiving, at a host device from a first accessory device, a first request for first media content, the first request comprising an audio recording of a first voice input to the first accessory device;
processing, at the host device, the first request, the processing to determine a first media identifier corresponding to the first media content based on the audio recording;
receiving, at the host device from a second accessory device, a second request for second media content, the second request corresponding to a second voice input to the second accessory device and the second request comprising a second media identifier of the second media content, the second media identifier generated by the second accessory device based on the second voice input;
bypassing, by the host device, the processing of the second request that comprises the second media identifier generated by the second accessory device;

storing, at the host device, a first context record including identification information for the first accessory device and the first context record including the first media identifier of the first media content that was determined by the host device;
storing, at the host device while storing the first context record, a second context record including identification information for the second accessory device and the second context record including the second media identifier of the second media content that was determined by the second accessory device;
streaming, from the host device to the first accessory device, the first media content based on the first media identifier determined by the host device and stored in the first context record; and
streaming, from the host device to the second accessory device and concurrently with the streaming of the first media content to the first accessory device, the second media content based on the second media identifier that was determined by the second accessory device and stored in the second context record.

20. The non-transitory computer-readable medium of claim 19, wherein the first request comprising the audio recording of the first voice input is received from the first accessory device responsive to detection of a trigger word or phrase in the first voice input by the first accessory device using natural language processing.

\* \* \* \* \*